(12) United States Patent
Florentin et al.

(10) Patent No.: US 6,820,919 B2
(45) Date of Patent: Nov. 23, 2004

(54) MOTOR VEHICLE DOOR

(75) Inventors: Thierry Florentin, Coburg (DE); Ralph Gerstlauer, Coburg (DE)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 0 days.

(21) Appl. No.: 10/415,155

(22) PCT Filed: Oct. 22, 2001

(86) PCT No.: PCT/DE01/04035

§ 371 (c)(1),
(2), (4) Date: Sep. 25, 2003

(87) PCT Pub. No.: WO02/34556

PCT Pub. Date: May 2, 2002

(65) Prior Publication Data

US 2004/0049989 A1 Mar. 18, 2004

(30) Foreign Application Priority Data

Oct. 25, 2000 (DE) .......................................... 100 52 739

(51) Int. Cl.[7] .................................................. B60J 5/00
(52) U.S. Cl. ................................ 296/146.6; 296/146.7; 296/146.9; 49/377
(58) Field of Search ............................. 296/154, 146.5, 296/146.7, 146.9, 1.08, 93, 213; 49/502, 377, 490.1, 498.1, 475.1; 52/716.8, 800.13

(56) References Cited

U.S. PATENT DOCUMENTS

| | | | | |
|---|---|---|---|---|
| 4,860,494 A | * | 8/1989 | Fujii et al. | 49/493.1 |
| 5,544,448 A | * | 8/1996 | Mass | 49/377 |
| 5,902,004 A | | 5/1999 | Waltz et al. | |
| 5,979,115 A | | 11/1999 | Szerdahelyi et al. | |
| 6,170,219 B1 | * | 1/2001 | Yada et al. | 52/716.5 |
| 6,185,872 B1 | | 2/2001 | Seeberger et al. | |
| 6,409,251 B1 | * | 6/2002 | Kaye et al. | 296/146.9 |
| 6,668,490 B2 | * | 12/2003 | Hock et al. | 49/502 |
| 6,732,474 B1 | * | 5/2004 | Eck et al. | 49/502 |
| 2003/0042752 A1 | * | 3/2003 | Arata et al. | 296/146.2 |
| 2003/0164624 A1 | * | 9/2003 | Kohara et al. | 296/146.7 |

FOREIGN PATENT DOCUMENTS

| | | |
|---|---|---|
| DE | 94 08 653 U1 | 11/1994 |
| DE | 195 09 282 A1 | 11/1996 |
| DE | 195 11 105 C1 | 11/1996 |
| DE | 196 22 310 A1 | 12/1997 |
| DE | 197 38 656 A1 | 3/1999 |
| DE | 199 15 151 A1 | 9/2000 |
| DE | 199 44 965 A1 | 3/2001 |
| EP | 0 684 157 A1 | 11/1995 |
| EP | 1 040 951 A1 | 10/2000 |
| EP | 1 138 535 A2 | 10/2001 |

OTHER PUBLICATIONS

International Search Report of corresponding International application No. PCT/DE01/04035, dated Mar. 13, 2002.
International Preliminary Examination Report of corresponding International application No. PCTDE01/04035, dated Feb. 11, 2003.
English translation of International Preliminary Examination Report (IPER) for International Application PCT/DE01/04035 filed Oct. 22, 2001.

* cited by examiner

*Primary Examiner*—Patricia L. Engle
(74) *Attorney, Agent, or Firm*—Christie, Parker and Hale, LLP

(57) ABSTRACT

The invention relates to a motor vehicle door with a door inner shell and a door outer shell joined thereto. A large-area opening in the door inner shell can be covered in a sealed manner by a supporting plate by means of a sealing area, and with a channel seal, which forms the upper termination of the inner parapet area. The motor vehicle door is characterized in that the upper edge of the supporting plate supports the channel seal. The ends of the channel seal are connected to lateral sealing areas of the supporting plate.

16 Claims, 6 Drawing Sheets

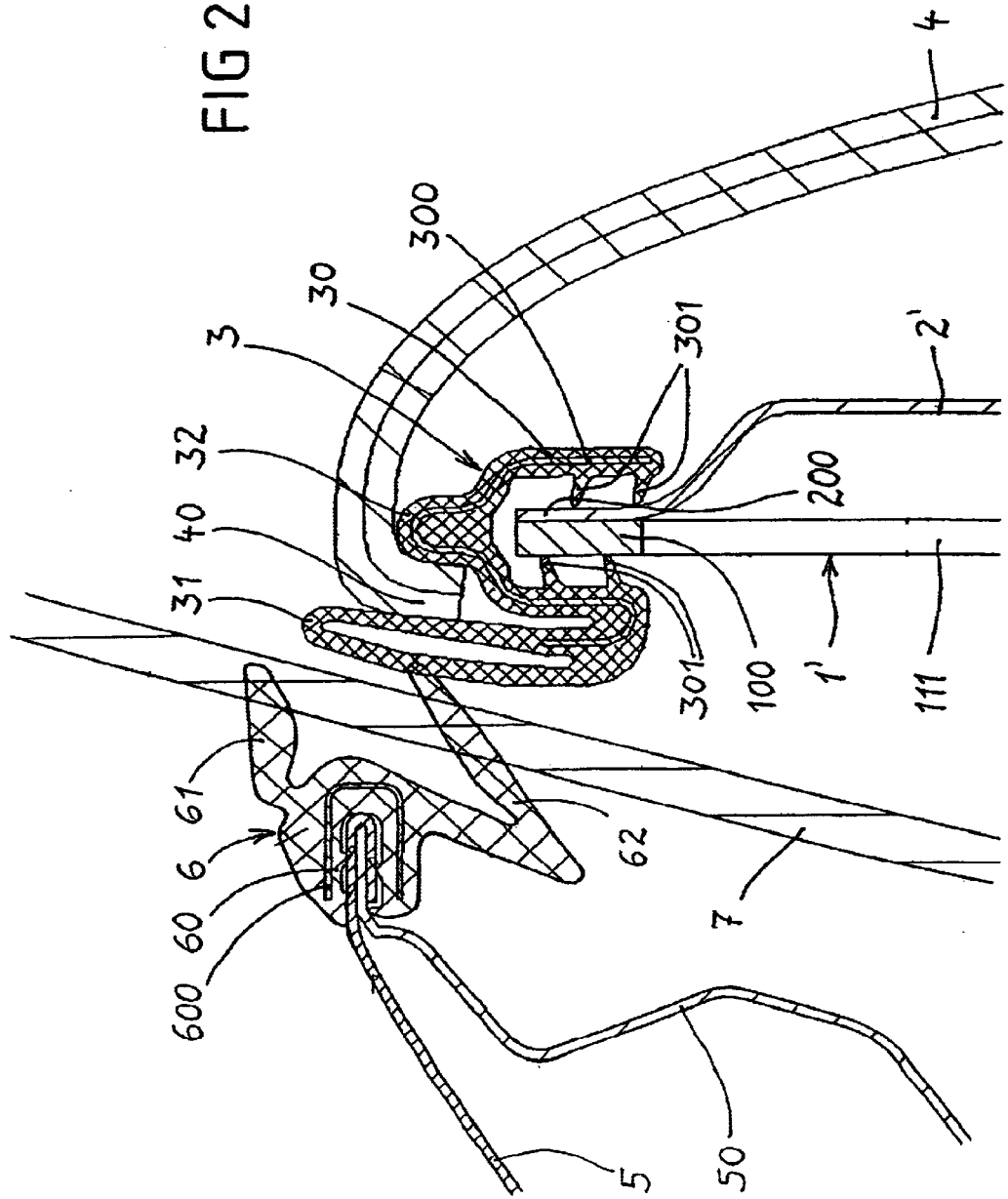

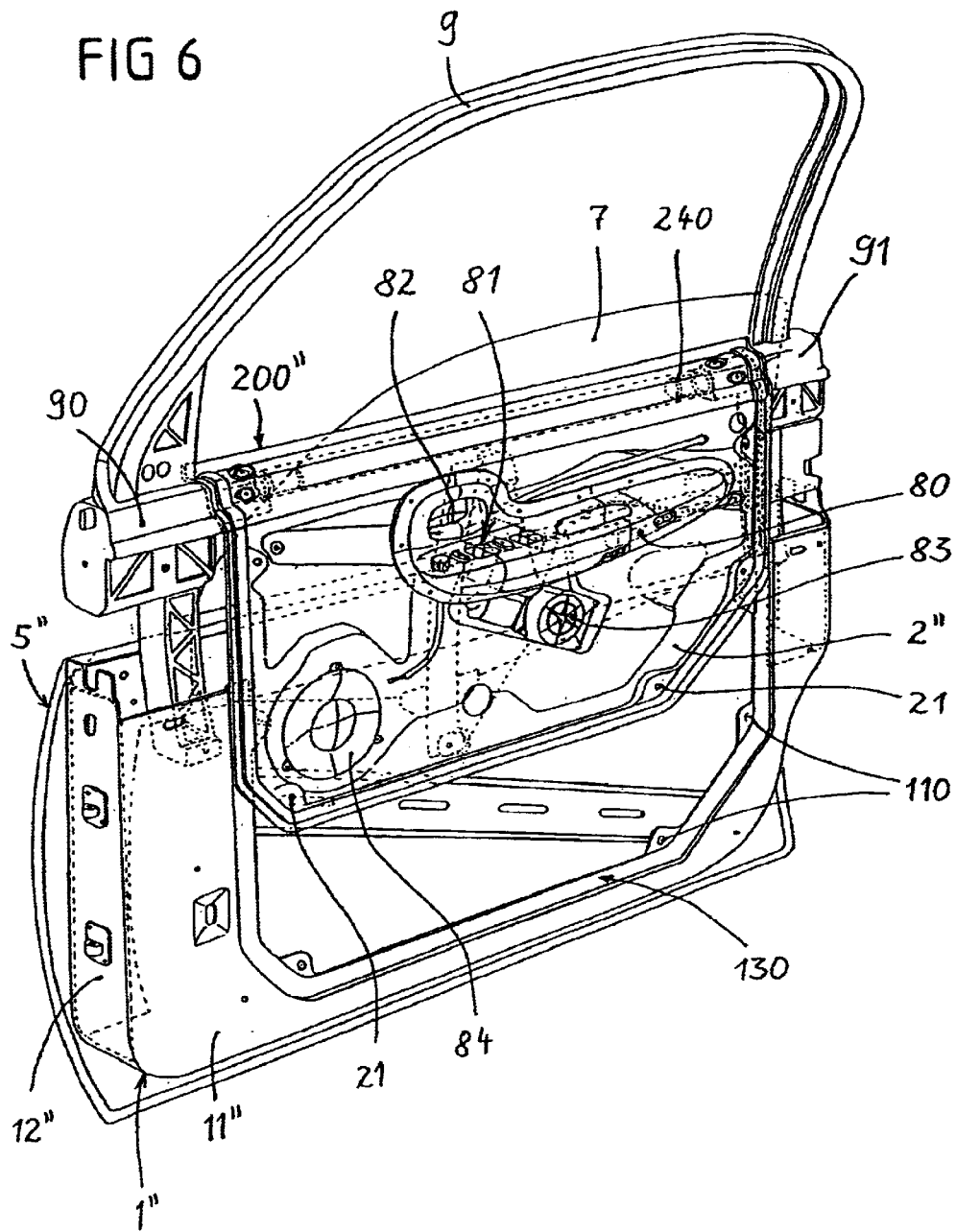

MOTOR VEHICLE DOOR

CROSS-REFERENCE TO RELATED APPLICATION

This application is a National Phase Patent Application of International Application Number PCT/DE01/04035, filed on Oct. 22, 2001, which claims priority of German Patent Application Number 100 52 739.6, filed Oct. 25, 2000.

FIELD OF THE INVENTION

The invention relates to a motor vehicle door. More particularly, the invention relates to a motor vehicle door having a wet/dry space separation in which the wet space on the side of the door outer shell is separated from the dry space on the side of the door inside trim.

BACKGROUND OF THE INVENTION

Vehicle doors of the generic type are known from DE 94 08 653 U1, DE 19509282 A1, DE 195 11 105 C1, DE 196 22 310 A1, DE 197 38 656 A1, DE 199 15 151 A1, DE 199 44 965 A1 and EP 0 684 157 A1. The door inner shells have an "assembly" opening of large area which can be closed by a support plate fitted with function elements. The opening may be advantageously utilized during assembly processes. In order to achieve an effective sealing contact—even in the event of pressure differences between the wet and dry spaces—a circumferential sealing cord is provided which extends along the edge of the opening in the door inner shell. A door structure of this kind enables pre-assembly and pre-checking of the function elements (e.g. window lifter, lock control electronics, electric connectors, etc.) before these are inserted with the support plate into the door body. By mounting the function elements on the dry space side it is possible to omit expensive damp protection. An inner channel seal which is to prevent moisture from penetrating into the interior passenger compartment, extends at a comparatively short distance from the upper substantially horizontally aligned sealing area between the support plate and door inner shell.

A channel seal having an integrated reinforcement element for the ledge area is described in U.S. Pat. No. 5,544,448. The disclosed reinforcement element has a clip-like fixing area which is engaged surrounding the upper end of the door inner shell. On the wet space side of the door inner shell the sheet metal plate of the reinforcement element continues down into an inverted area in order to finish in a closed profile. An adjoining arm supports the sealing lips of the channel seal facing the inside of the window pane.

Other vehicle doors with various sealing arrangements are also known. It would be desirable to provide a motor vehicle door with a configuration and channel seal that meets wet/dry space separation requirements with reduced sealing costs.

SUMMARY OF THE INVENTION

The present invention provides a vehicle door having a door inner shell, a door outer shell connected thereto and a large area assembly opening in the door inner shell which can be sealingly covered by a support plate fitted with function elements whereby the high demands on the wet/dry space separation are met with reduced sealing costs.

The present invention achieves this objective by providing a channel seal forming the upper closure of an inner ledge area that is supported by an upper edge of the support plate whereby the ends of the channel seal are connected to the side sealing areas of the support plate. This produces a closed uninterrupted sealing contour. The upper sealing area formed by the channel seal thus forms a seal between the door inner shell and the support plate. In one embodiment, the channel seal can include a clip-like fixing area with a metal insert that is engaged with and surrounds the upper edge area of the support plate and has a laterally protruding area which supports the sealing lips associated with the inside of the window pane.

According to another exemplary embodiment, the invention provides that the door inner shell has in the ledge area, the overall shaft reinforcement on the inside and the upper contour of the support plate extends substantially along the upper contour of the ledge area of the door inner shell. The channel seal thereby engages and covers both the upper edge of the support plate and also the upper edge of the door inner shell.

According to another exemplary embodiment, the invention provides the door inner shell having, in the ledge area, an upper part of the inside shaft reinforcement, and the support plate has a lower part of the inside shaft reinforcement. In this case the upper edges of the support plate and door inner shell form a common closure which is engaged by the fixing areas of the channel seal. In the reverse case in which the door inner shell forms in the ledge area the lower part of the inside shaft reinforcement and the support plate forms the upper part of the inside shaft reinforcement, the channel seal may be connected solely to the upper contour of the support plate. This type of fixing for the channel seal is in any case necessary if the support plate in the ledge area forms the entire internal shaft reinforcement.

The channel seal may include a bead which serves to hang the door inside trim panel above its fixing area.

The sealing areas between the support plate and the associated lateral edge areas and the lower edge area of the opening in the door inner shell can be formed by a continuous sealing element, e.g. in the form of an injection-moulded or stuck-on sealing cord. A further possibility for forming the sealing areas consists of causing an elastic sealing foil to adhere onto the support plate, more particularly in the form of a foamed foil.

The support plates can be manufactured simply as stamped parts of sheet steel or of another sheet metal material, whereby the shaft reinforcement can be formed where necessary by stamping and/or bending processes. An even higher degree of integration can be achieved with a support plate in the form of a light metal cast part. In this embodiment, bearing sites or fixing elements can also be formed without having to make an opening which penetrates through the wet/dry space separation.

In another exemplary embodiment, the support plate may be formed of injected plastic. When using a support plate in the form of a plastics injected part using multi-component technology, the channel seal may be formed by means of sufficiently flexible plastics components which are integrated into the support plate in one piece. Furthermore the remaining sealing areas provided on the support plate (the lower and the side sealing areas between the support plate and the associated edge areas of the opening in the door inner shell) can also be integrated in one piece into the support plate.

BRIEF DESCRIPTION OF THE DRAWINGS

The invention will now be explained with reference to embodiments shown in the drawings in which:

FIG. 1d shows a diagrammatic end view of the assembled parts shown in FIG. 1a;

FIG. 2 shows a cross-sectional view of an exemplary embodiment of the vehicle door of the present invention, through the large area opening in the door inner shell;

FIG. 6 shows a perspective view of an exemplary motor vehicle door of the present invention having a frame module, which can be inserted from above into the door box formed from the door inner shell and the door outer shell.

DETAILED DESCRIPTION

Figure 1A:
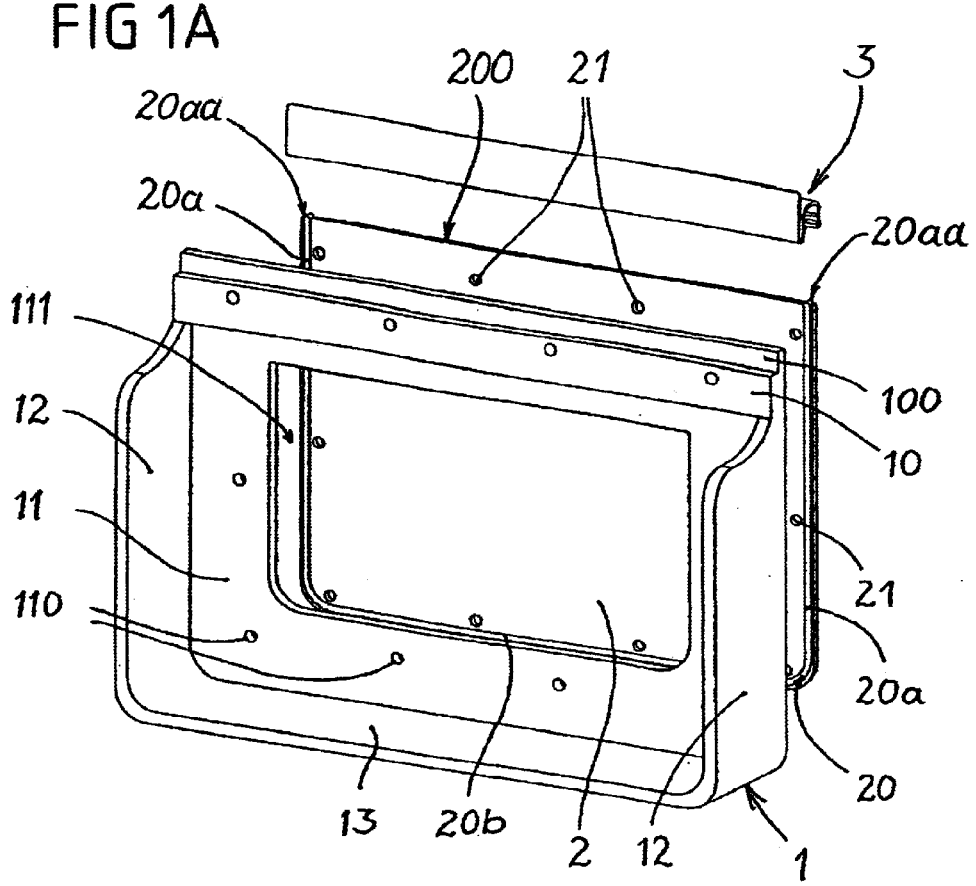
FIG. 1a shows a diagrammatic view of an exemplary door inner shell, support plate and inside channel seal of the present invention, in an exploded view.

Provided is a new door concept according to which the upper edge 200 of the support plate 2, 2', 2" that covers the assembly opening 111 provided in the door inner shell 1, 1', 1", supports the channel seal 3. This enables reduced sealing costs when compared to known door concepts with a so-called wet/dry space separation because the channel seal 3 also seals the support plate 2, 2', 2" together to the door inner shell 1, 1', 1". A conventional sealing strip which is otherwise necessary in this area is therefore not needed. Material and production costs can thereby be saved. Furthermore, the raised contour (i.e. upper edge) of the support plate additionally provides an enlarged assembly surface for diverse pre-assembled function units if the ledge area of the door inner shell is made narrower towards the top or is completely replaced by a ledge reinforcement integrated in the support plate.

Figure 1B:
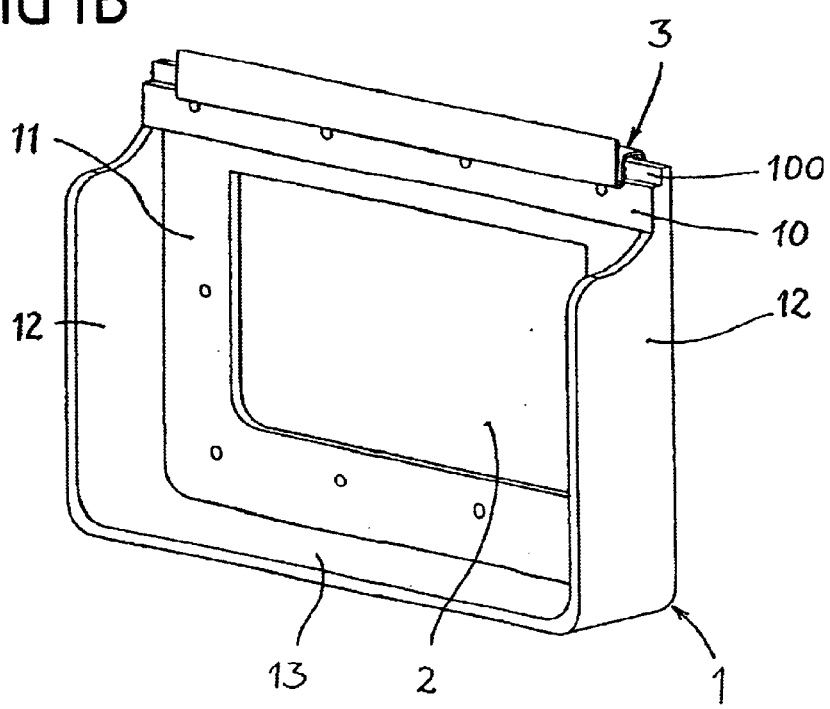
FIG. 1b shows a diagrammatic view of the parts shown in FIG. 1a, after assembly.
Figure 1C:
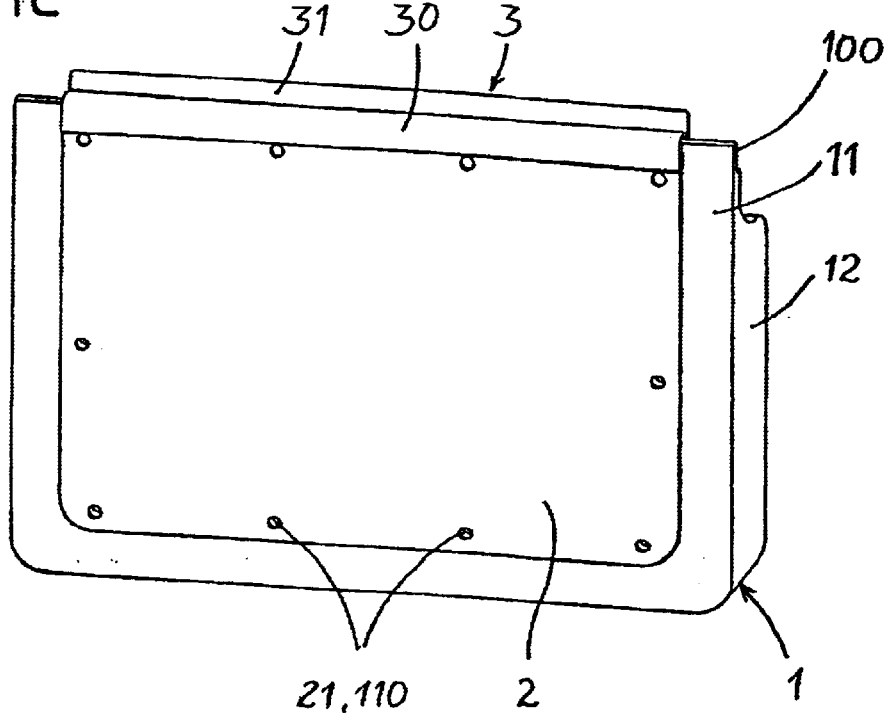
FIG. 1c shows a diagrammatic view of the assembled parts shown in FIG. 1a, from the side of the support plate.
Figure 1D:
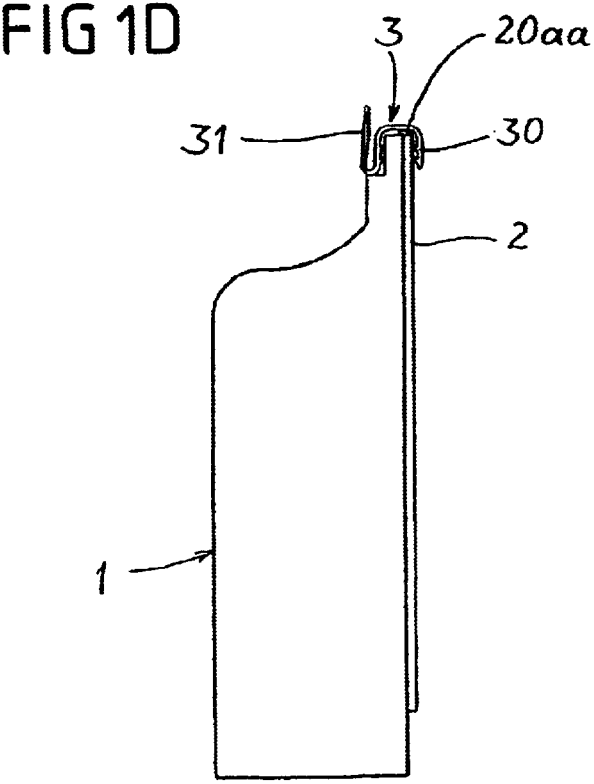

The door concept is shown diagrammatically in FIG. 1a to 1d which show a door inner shell 1 which may be a light metal cast part (e.g. of aluminium or magnesium alloy) or a sheet metal or injected plastic part in various exemplary embodiments. FIGS. 1a and 1b show the door inner shell 1 from the side of the door inner shell. The door inner shell consists substantially of an inner wall facing the passenger compartment and having a large area assembly opening 111 therethrough. By assembly opening, it is meant that this opening may be utilized for the assembly of function elements which may be on support plate 2. In an upper portion, i.e. the ledge area, door inner shell 1 includes a ledge reinforcement 10 with a web-like closure member designated web 100. The door base 13 and the side walls 12 extend out at an angle sideways from the inner wall 11 (i.e. generally orthogonal to inner wall 11) and may be fitted with the door hinges (not shown) and the lock. The inside wall 11 is associated with a support plate 2 which can completely cover the opening 111 and which supports a seal 20a and 20b which extend along the side edges and the lower edge, respectively, of support plate 2 to form a lower sealing area and side sealing areas between the support plate 2 and door inner shell 1. The side edges and seal 20a end on the upper edge of the support plate 1 in an end area 20aa associated with the channel seal 3. The door inner shell 1 is joined to support plate 2 as shown in FIGS. 1b–1d. The connection between the door inner shell 1 and the support plate 2 is through screws or rivets through the fixing openings 21, 110 shown in FIG. 1c, but other means for fastening may be used in other exemplary embodiments.

The inner channel seal 3 includes a U-shaped fixing area that can be fitted onto the product of the combination of door inner shell 1 and support plate 2. U-shaped fixing area 30 thereby engages the upper edges 100, 200 of the door inner shell 1 and support plate 2, respectively, by surrounding them (see FIG. 1d) whereby the inner base surface of the U-shaped fixing area 30 enters into contact with the end areas 20aa of the side sealing areas 20a of the support plate and thus forms a closed seal which meets the demands required for the wet/dry space separation.

The section of the ledge area of a vehicle door shown in FIG. 2 corresponds to the door concept according to FIGS. 1a–1d and shows—in addition to further details of the inner channel seal 3—also the outer channel seal 6 which is supported by an end area formed by the door outer shell 5 and the outer ledge reinforcement 50 flanged therewith. The fixing area 60 of the channel seal 6 has a U-shaped metal clip 600 which produces the necessary holding forces. Two molded sealing lips 61, 62 serve to bear against the outer surface of the window pane 7.

The inner channel seal 3 likewise has in the fixing area 30 a metal clip 300 shaped so that the one end area of the metal clip 600 can also support the sealing lip 31 which is provided to bear against the inner surface of the window pane 7. Furthermore at the base of the substantially U-shaped fixing area 30 there is a projection 32 which serves for mounting the end 40 of the door inner trim panel 4. In the inside of the fixing area 30, a sealing material is shaped into sealing lips 301 which adjoin and surround the upper edges 100, 200 of the door inner shell 1' and support plate 2'.

Figure 3:
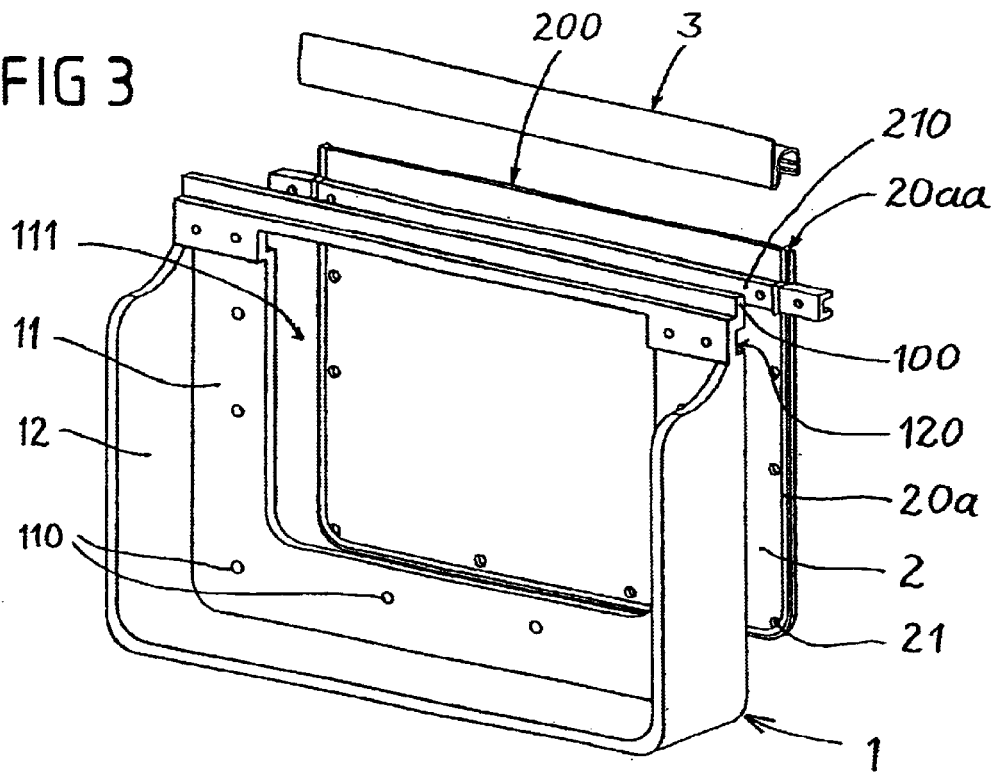
FIG. 3 shows a diagrammatic exploded view of an exemplary door inner shell of the present invention, having a ledge reinforcement which extends into the area of the channel seal.

The exemplary door shown in FIG. 3 includes a door inner shell 1 with a reduced inner ledge reinforcement which closes at the top with the web 100. Web 100 is supported from beneath by a ledge reinforcement 210 which is connected to the support plate 2 and which is insertable by its ends projecting over the side edges of the support plate 2 into the channel-like recess 120 of the door inner shell 1. The side sealing area 20a thereby also extends over the ledge reinforcement 210 and ends at the side end edge 200 of the support plate 2 so that after fitting the channel seal 3 it is ensured that the latter connects with the seal 20a, 20aa of the support plate 2. The channel seal 3 engages similar to the embodiments described in FIGS. 1a to 2 with its fixing area 30 adjoining and surrounding the upper edges of the door inner shell 1 and the support plate 2.

Figure 4:
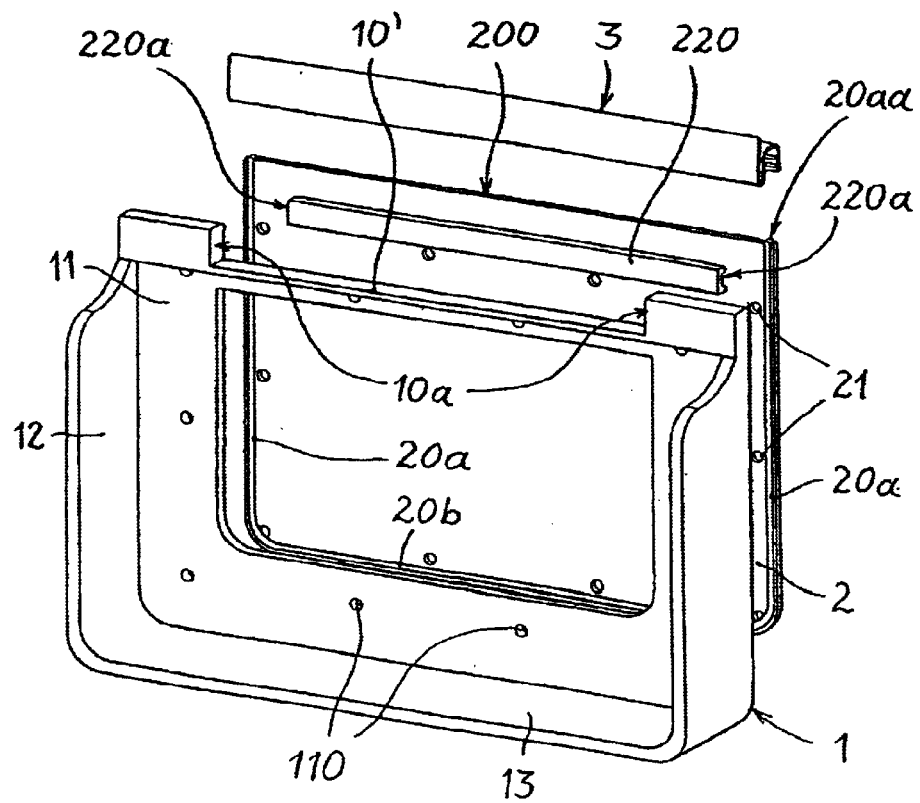
FIG. 4 shows a diagrammatic exploded view of an exemplary door inner shell of the present invention, having a ledge reinforcement which does not reach into the area of the channel seal.

In another exemplary embodiment, FIG. 4 shows a door with a ledge reinforcement 220 which is mounted on the support plate 2 and which is inserted by its outer end faces 220a between the inner end faces 10a of the side struts 11, 12. Underneath this ledge reinforcement 220 is a ledge reinforcement 10' which connects the struts 11, 12 of the door inner shell 1. In the present case the upper contour 200 of the support plate 2 projects over all areas of the door inner shell 1 and therefore supports the channel seal 3. Thus, pre-assembly of the channel seal 3 on the support plate 2 is fundamentally possible prior to assembling the door.

Figure 5:
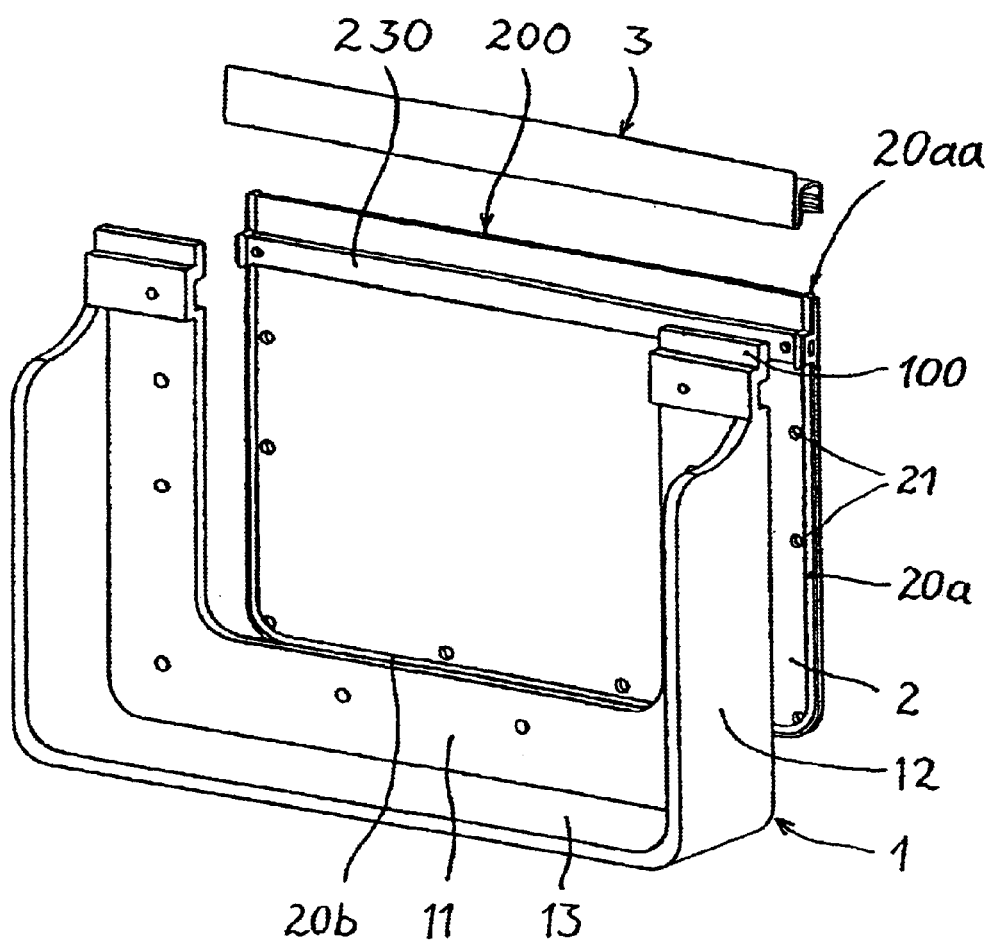
FIG. 5 shows a diagrammatic exploded view of an exemplary door inner shell of the present invention without any ledge reinforcement.

The exemplary door illustrated in FIG. 5 differs from that according to FIG. 4 basically only in that the door inner shell 1 has no ledge reinforcement such as ledge reinforcement 10' shown in FIG. 4, and that the ledge reinforcement 230 of the support plate 2 extends over the entire width of the support plate 2. Ledge reinforcement 230 is substantially completely on the support plate 2. Even in this case the upper contour 200 of the support plate 2 forms the closure for the wet/dry space separation and supports the channel seal 3.

FIG. 6 shows a perspective view of a motor vehicle door with a frame module according to the exemplary door shown in FIG. 5. The door body is formed by a door box which is formed from the door outer shell 5" and the door inner shell 1" and is open to the top so that the frame module can be inserted and fitted therein. The window frame 9 and the support plate 2" are connected together through joining members 90, 91 whereby the joining members 90, 91 serve to adjust the frame 9 relative to the door box 1", 5" and for assembly. Fixing spots 21, 110 are provided along the sealing area 130 to connect the support plate 2" to the inside wall 11" of the door inner shell 1".

The ledge area of the door is formed by a tubular ledge reinforcement 240 which is connected through bolt like pins to the joining members 90, 91. The support plate 2" is fixed thereon, with its upper region being adapted to the desired contour of the ledge and enclosing the ledge reinforcement 240 in part. The closing upper contour 200" of the support plate 2" is formed by an upwardly angled edge area which supports the inner channel seal 3 (not shown).

The support plate 2" forms with its pre-fitted function units one unit capable of being pre-checked so that high quality standards can be met. Such function units can be for example an arm rest (80), switch unit (81) for controlling the electrically driven window lifters or mirrors, a drive unit (83) for a window lifter, a door inside opener (82), a speaker (84) or a wiring harness. Arranging the function units on the dry space side of the door arrangement enables considerable savings to be made by avoiding wet space designs which would otherwise be necessary.

What is claimed is:

1. A motor vehicle door comprising
   a door inner shell and a door outer shell connected thereto,
   a support plate sealingly covering an opening formed through the door inner shell at a sealing area including a lower sealing area and side sealing areas, and
   a channel seal forming an upper closure in a ledge area, supported by an upper edge of the support plate and having opposed ends each connected to a respective one of the side sealing areas of the support plate.

2. The motor vehicle door according to claim 1, further comprising the door inner shell having a ledge reinforcement in the ledge area.

3. The motor vehicle door according to claim 1, further comprising a ledge reinforcement, wherein the door inner shell has in the ledge area one of an upper part of the ledge reinforcement and a lower part of the ledge reinforcement and the support plate has the other one of the upper part of the ledge reinforcement and the lower part of the ledge reinforcement.

4. The motor vehicle door according to claim 2 or 3, wherein the upper edge of the support plate extends substantially along an upper edge of the door inner shell and the channel seal extends around the respective upper edges of the support plate and the door inner shell.

5. The motor vehicle door according to claim 1, further comprising a ledge reinforcement formed completely on the support plate in the ledge area.

6. The motor vehicle door according to claim 1, wherein the channel seal has a metal spring-elastic clip as a fixing element.

7. The motor vehicle door according to claim 1, wherein the channel seal includes a projection for mounting a door inside trim panel thereover, the projection extending above a fixing area of the channel seal.

8. The motor vehicle door according to claim 1, wherein the lower sealing area and the side sealing areas are formed between the support plate and the associated edge areas of the opening of the door inner shell, the lower sealing area and side sealing areas formed by a continuous sealing element.

9. The motor vehicle door according to claim 1, wherein the lower sealing area and the side sealing areas are formed between the support plate and the associated edge areas of the opening of the door inside shell, the lower sealing area and side sealing areas formed by an elastic sealing foil lining that lines the support plate.

10. The motor vehicle door according to claim 1, wherein the support plate and the channel seal are an integral injection molded part formed of two components, and the channel seal is formed by a softer plastics component than the support plate.

11. The motor vehicle door according to claim 1, wherein the lower sealing area and the side sealing areas are disposed between the support plate and the associated edge areas of the opening in the door inner shell and are formed of a single integral piece of the support plate.

12. The motor vehicle door according to claim 1, wherein the support plate is a light metal cast part formed of aluminium or a magnesium alloy.

13. The motor vehicle door according to claim 1, wherein the support plate is a sheet metal part.

14. The motor vehicle door according to claim 8, wherein the continuous sealing element is one of an injection-molded sealing cord and a stock-on sealing cord.

15. The motor vehicle door according to claim 9, wherein the elastic sealing foil is a foamed foil.

16. The motor vehicle door according to claim 15, wherein the sheet metal part is a stamped metal part.

* * * * *